UNITED STATES PATENT OFFICE.

PHILIP SCHIDROWITZ AND OTTO ROSENHEIM, OF LONDON, ENGLAND, ASSIGNORS TO THE JOSEPH TURNER & COMPANY, LIMITED, OF QUEENSBERRY, ENGLAND.

PIPERIDIN SALTS AND PROCESS OF MAKING SAME.

SPECIFICATION forming part of Letters Patent No. 615,051, dated November 29, 1898.

Application filed December 21, 1897. Serial No. 662,930. (Specimens.)

*To all whom it may concern:*

Be it known that we, PHILIP SCHIDROWITZ and OTTO ROSENHEIM, of 57 Chancery Lane, London, England, have invented a certain new and useful Improvement in the Manufacture of New Products from Piperidin, of which the following is a specification.

This invention relates to the manufacture of new products from piperidin. These new products are obtained by the action of dicarboxy fatty acids on piperidin, the result being new salts or bodies—namely, dicarboxylic salts of piperidin—which possess valuable pharmacological and therapeutic properties. The dicarboxy fatty acids which we have found most suitable are tartaric acid and succinic acid, and the dicarboxylic salts of piperidin, which we obtain by treating piperidin with these acids according to our invention, are respectively tartrate of piperidin and succinate of piperidin.

In carrying out our invention when the dicarboxy fatty acid employed to act upon piperidin is tartaric acid we make an approximately saturated cold solution of seventy-five parts (equal to one molecule) of tartaric acid and then add forty-two parts (equal to one molecule) of piperidin. Heat is evolved. On cooling the salt is recrystallized from hot alcohol or other suitable solvent, and tartrate of piperidin is obtained in the form of prismatic plates. The product has a melting-point of 136° to 137° centigrade and is readily soluble in cold water and corresponds to the formula $C_5H_{11}N.C_4H_6O_6$.

When the dicarboxy fatty acid employed to act upon piperidin is succinic acid, we melt together one hundred and eighteen parts (equal to one molecule) of succinic acid and one hundred and seventy parts (equal to two molecules) of piperidin at a water-bath temperature. On cooling the melt is recrystallized from alcohol or other suitable solvent. The product, which is a succinate of piperidin, is in the form of white prismatic plates. It has a melting-point of 142° to 143° centigrade. It is soluble in water and hot alcohol, but not readily soluble in cold alcohol, and corresponds to the formula $(C_5H_{11}N)_2.C_4H_6O_4$.

What we claim, and desire to secure by Letters Patent, is—

1. As new products, dicarboxylic salts of piperidin, being a compound formed by the action of a dicarboxy acid upon piperidin, having the form of prismatic plates and soluble in water.

2. As a new product, tartrate of piperidin, being a compound formed by the action of tartaric acid upon piperidin, melting at 136° to 137° centigrade and having the formula $C_5H_{11}N.C_4H_6O_6$.

3. The method of producing a dicarboxylic salt of piperidin which consists in treating piperidin with a dicarboxy fatty acid, substantially as hereinbefore described.

4. The method of producing tartrate of piperidin which consists in treating piperidin with tartaric acid substantially as hereinbefore described.

In witness whereof we have hereunto signed our names in the presence of two subscribing witnesses.

PHILIP SCHIDROWITZ.
OTTO ROSENHEIM.

Witnesses:
GEORGE C. BACON,
ROBERT N. SPEARPOINT.